United States Patent
Lee

Patent Number: 6,134,575
Date of Patent: Oct. 17, 2000

[54] FACTORY MODE FREE SETTING APPARATUS AND METHOD THEREOF

[75] Inventor: Ji-young Lee, Seoul, Rep. of Korea

[73] Assignee: SamSung Electronics Co., Ltd., Kyungki-do, Rep. of Korea

[21] Appl. No.: 08/676,496

[22] Filed: Jul. 8, 1996

[30] Foreign Application Priority Data

Jul. 7, 1995 [KR] Rep. of Korea .................. 19928/1995

[51] Int. Cl.$^7$ ................................................. G05B 11/01
[52] U.S. Cl. .................................... 708/709.16; 455/12.1; 455/569; 345/508; 345/511
[58] Field of Search ............................... 364/146, 468.24; 348/3, 7; 358/183; 455/12, 12.1, 569; 701/102; 395/834; 379/21, 387; 370/241; 345/508, 511

[56] References Cited

U.S. PATENT DOCUMENTS

| | | |
|---|---|---|
| 4,876,737 | 10/1989 | Woodworth et al. ................ 455/12 |
| 5,093,726 | 3/1992 | Chun ................................. 358/183 |
| 5,122,790 | 6/1992 | Yasuda et al. ..................... 340/784 |
| 5,226,822 | 7/1993 | Morris ............................... 434/359 |
| 5,407,357 | 4/1995 | Cutler ............................... 434/335 |
| 5,438,614 | 8/1995 | Rozman et al. ................... 379/93 |
| 5,442,146 | 8/1995 | Bell et al. .......................... 177/210 |
| 5,654,738 | 8/1997 | Spurlock ........................... 345/132 |
| 5,677,732 | 10/1997 | Moon ............................... 348/190 |

OTHER PUBLICATIONS

Nakamura et al., "A Fault Diagnosis System Based on Parallel Interaction", IEEE, pp. 100–105, Jun. 1988.

S. J. Bailey, Control Engineering, From Desktop to Plant Floor, A CRT is the Control Operator's Window on the Process, Control Engeneering/pp. 86–90, Jun. 1984.

*Primary Examiner*—William Grant
*Assistant Examiner*—McDieunel Marc
*Attorney, Agent, or Firm*—Robert E. Bushnell, Esq.

[57] ABSTRACT

A technique for collectively setting a factory mode of operation of a monitor offers adjustments or modifications for particulars of mode data to meet user requirements, by transmitting a set of factory mode timing data from an external controller to an electrically erasable programmable read only memory using a serial interface data communication. A factory mode data transmission process includes the steps of transmitting a start data signal to a microcomputer in a monitor when a storage key input is fed to the external controller, repeatedly sending the timing data until a mode end signal is input and sending a mode end data to the microcomputer when a mode end signal is input. In addition, a factory mode data receiving process includes the steps of sending back the start data received to the external controller, storing mode timing data received into a factory mode address reserved in a memory in the monitor and ending the reception of mode timing data when mode end data is inputted. Consequently, any operation mode according to user requirements is able to be set in a monitor, without modifying a preinstalled program in a microcomputer housed therein, at a low cost.

17 Claims, 4 Drawing Sheets

FACTORY MODE FREE SETTING APPARATUS AND METHOD THEREOF

CROSS-REFERENCE TO RELATED APPLICATIONS

This application makes reference to, incorporates the some herein, and claims all benefits accruing under 35 U.S.C. §119 by virtue of a patent application earlier filed in the Korean Industrial Property Office on Jul. 7, 1995 entitled FACTORY MODE SETTING APPARATUS AND METHOD THEREOF which was duly assigned Ser. No. 95-19928 by that Office.

BACKGROUND OF THE INVENTION

The present invention relates in general to apparatus and method for setting factory modes of operation in the modes of a monitor and, more particularly, to methods and apparatus for free setting operating modes of a monitor by writing factory mode timing data transmitted from an external controller into a memory device by way of operation of a micro computer housed therein, thereby providing an adjustable operational mode setting responsive to user requirements.

Factory mode adjustment is a comprehensive technical term generally accepted in the arts, refers to a pre-arrangement of adjusting various parameters required for proper operation of a monitor when delivered from a warehouse for user convenience. In consequence, when powered on, the screen size of a display according to preset user mode data is displayed on the screen of a monitor when prearranged by user adjustment, otherwise a factory mode setting is then displayed.

SUMMARY OF THE INVENTION

It is therefore an object of the present invention to provide an apparatus and method for setting in a monitor, an operating mode selected by user interaction with an external controller.

It is another object to provide apparatus and method for setting factory mode adjustment by transferring data including factory mode timing data from an external controller to an electrically erasable programmable read only memory by operation of a microcomputer housed in a monitor, by way of either serial interface communication or inter-integrated circuit bus communication, thereby enabling a monitor to visually display a view factory mode adjustment in response to user requirements.

A factory mode free setting apparatus constructed according to the principles of the present invention incorporates an external controller, which is a JIG, for transmitting factory mode timing data stored in a memory means thereof to a memory device in a monitor for storage and a monitor for storing such data in its memory means responsive to control signals generated from the external controller.

A process for setting a factory mode of operation of a monitor according to the principles of the present invention is contemplated with the steps of providing transmitting stage and receiving stage of factory mode data between an external controller and monitor. During the factory mode data transmitting stage, this process includes the steps of transmitting factory mode start data to a microcomputer housed in a monitor when a factory mode storage key signal is input at an input terminal of external controller, transmitting factory mode timing data to the micro computer until a factory mode end key signal is input at the terminal when the result of comparison of factory mode start data communication exchanged between the external controller and the microcomputer and transmitting to the microcomputer a factory mode end data signal when the factory mode end key signal is input at the terminal.

During the factory mode receiving stage associated with the above factory mode transmitting stage, this process includes the steps of transmitting factory mode start data is received therefrom, writing into and storing received factory mode timing data transmitted from an external controller in factory mode addresses provided in a memory device in a monitor and ending reception of terminal mode timing data when factory mode end data is received at an input terminal of the microcomputer in a monitor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

In the following detailed description, many specific details are set forth to provide a more through understanding of the present invention. In will be apparent, however, to those skilled in the art, that the present invention may be practiced without specific details. In other instances, well known circuit components have not been described so as not to obscure the present invention.

DETAILED DESCRIPTION OF THE PREFERRED EMBODIMENT

Figure 1:
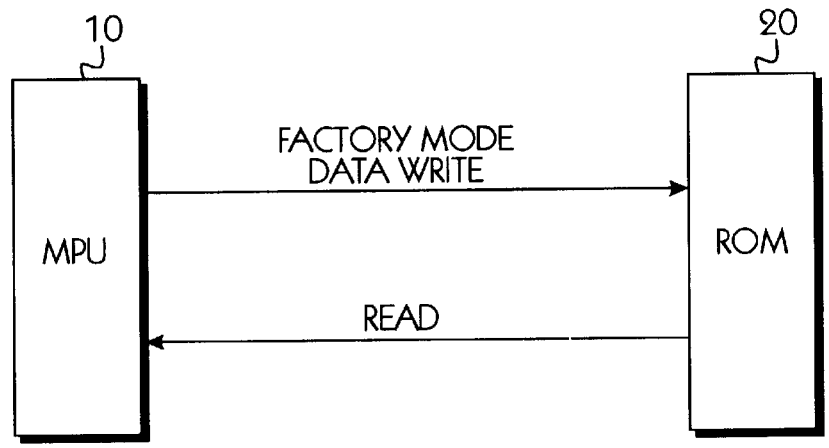
FIG. 1 is a schematic block diagram illustrating a portion of conventional factory mode setting circuitry.

Turning now to the drawings, a representation of an exemplary design for an apparatus for setting a factory mode of operation of a monitor is illustrated in block form in FIG. 1. Timing date for such as, for example, horizontal and vertical frequencies and horizontal and vertical polarities, are set in microcomputer 10. Factory mode data are preset by masking in a read only memory associated with microcomputer 10, and therefore permanently available and serving as like a firmware in a microprocessor unit. On occasions, different factory mode data from those stored in memory device associated with microprocessor 10 is required to meet user demand. For an exemplar purpose, in the instance of operating mode of a monitor of which particulars masked in a read only memory ROM in the mode are:

50 kHz<horizontal Frequency≧60 kHz; Vertical Frequency≦65 Hz, mode 5

50 kHz<horizontal Frequency≧60 kHz: Vertical Frequency≧65 Hz, mode 6 and if particulars of a user mode are:

Horizontal frequency 56 kHz, Vertical Frequency 70 Hz

Horizontal frequency 58 kHz, Vertical Frequency 76 Hz then when displayed, a collision occurs in operation mode 6, creating distortion of a display or alternatively displaying unwanted size of view, thereby presenting a problem. In the conventional technique however, a masking of read only memory ROM 20 for data storage in addresses as well as a program for operating preset a factory mode are subject to change for another mode of operation.

In changing a factory mode preset in microcomputer 10, a masking of read only memory requires substantial time at a relatively high cost.

Factory mode setting apparatus and method thereof accompanying drawings. Referring now FIG. 2, the one preferred embodiment according to the present invention is illustrated in block form. External controller 100 which may typically be a JIG for extraneously adjusting particulars of operation mode of a monitor, transmits to monitor mode of a monitor, transmits to monitor 200 factory mode timing data comprising horizontal and vertical synchronizing frequencies, resolution parameters and information data by way of either serial interface of alternatively Inter-integrated Circuit Bus I²C communication.

A memory device provided in external controller 100 stores factory mode timing data and information data, etc. in response to user requirement. Monitor 200 writes a received factory mode timing data from external controller 100 into a memory device incorporated therein, or alternatively read out either one of factory mode data or user mode data from the device.

Here, the above memory device are provided with addresses consisted of both reserved area for factory mode data and user mode data.

As a result, adjustment on factory mode timing data stored in a memory device in external controller 100 may cause change of timing data for operation mode of a monitor without modification of a program in a microcomputer housed therein.

Figure 2:
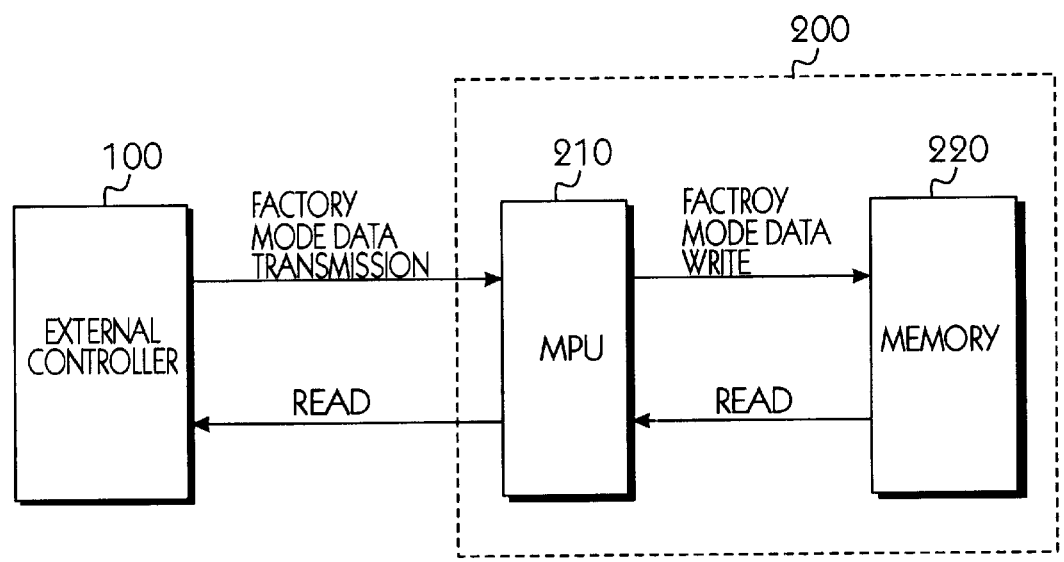
FIG. 2 is a schematic block diagram illustrating factory mode setting apparatus of one preferred embodiment constructed according to the principles of the invention.
Figure 3:
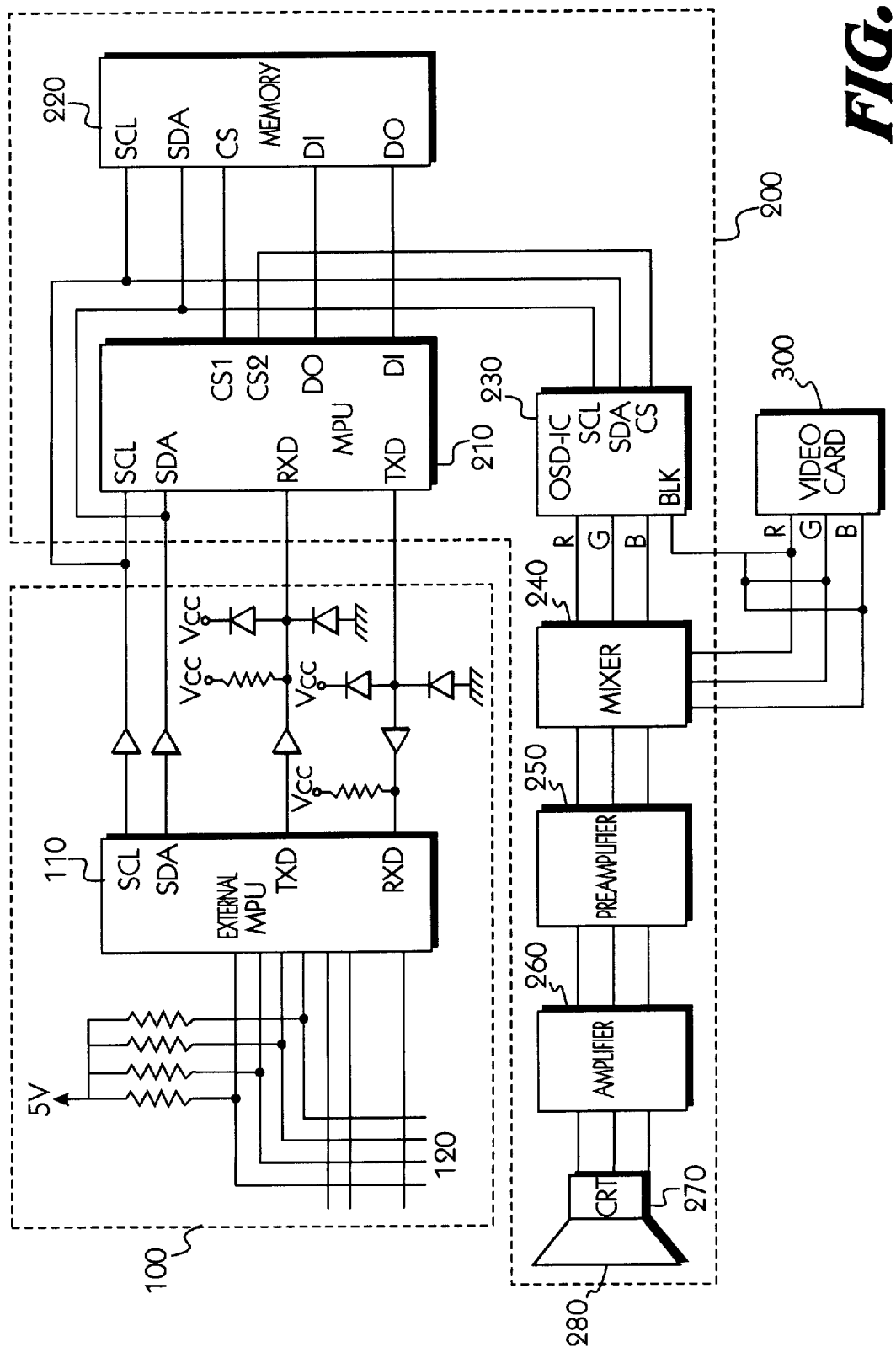
FIG. 3 is a detailed circuit diagram of factory mode setting apparatus of FIG. 2, incorporating various circuits in block form for illustrating overall construction of one referred embodiment of the present invention.

A detailed circuit diagram of FIG. 2 in conjunction with relevant various circuits in block form is illustrated in FIG. 3. External controller 100 comprises external microcomputer 110 and key input device 120 connected to a plurality of input terminals of external microcomputer 110 inputting a key signal caused by manipulation of a key stroke. External microcomputer 110 incorporates a memory device which is an electrically erasable programmable read only memory EEPROM or may be alternatively connected with externally provided memory device (not shown).

External microcomputer 110 is provided with a pair of ports SCL and SDA for outputting respective serial clock signal and serial data signal so as to communicate with monitor 200 by using Inter-Integrated Circuit Bus Protocol. In addition, external microcomputer 110 is also provided with input and output port RXD, TXD so as to communicate data with monitor 200. As a result, between external microcomputer 110 and monitor 200 are established two way of communication using either a pair of ports SCL, SDA or alternatively input/output ports RXD, TXD. One of the above described two communication methods may be selected as necessary.

Monitor 200 comprises microcomputer 210 and memory 220 which typically is an electrically erasable programmable read only memory EEPROM. Microcomputer 210 has its respective ports SCL, SDA, RXD and TXD connected to corresponding ports in external microcomputer 110. A pair of ports SCI, SDA, chip select port CAI and data input/output port DI, DO provided in microcomputer 210 may partially be selected to connect with a pair of ports S.L., SEA in memory 220 so as to establish Inter-integrated Circuit Bus communication channel, or alternatively be selected to connect with chip select port CS and a pair of input/output part DI, DO for serial data communication.

A pair of ports SCL, SDA as well as chip select port CS2 in microcomputer 210 are respectively connected to each of corresponding ports SCL., SDA and CS in On-Screen Display Integrated Circuit OSD-IC 230, which is provided with factory mode data or user mode data from microcomputer 210, responsive data input, generating red, green, blue component signal to mixer 240 so as to display on a screen of a monitor in an on screen display state.

Mixer 240 mixes both video signals, each comprised of red R, green G, and blue B component signals, output from a video card 300 in an external computer system and On Screen Display Integrated Circuit OLD-IC 230, and has connected its output terminals to corresponding input terminals in preamplifier 250 which pre-amplifies a mixed signal input. Amplifier 260 has its input terminals connected to the output terminals of preamplifier 250 and also has connected its output terminals to a plurality or corresponding input terminals of a cathode ray tube CRT 270 so as to output amplified mixed signals.

Figure 4:
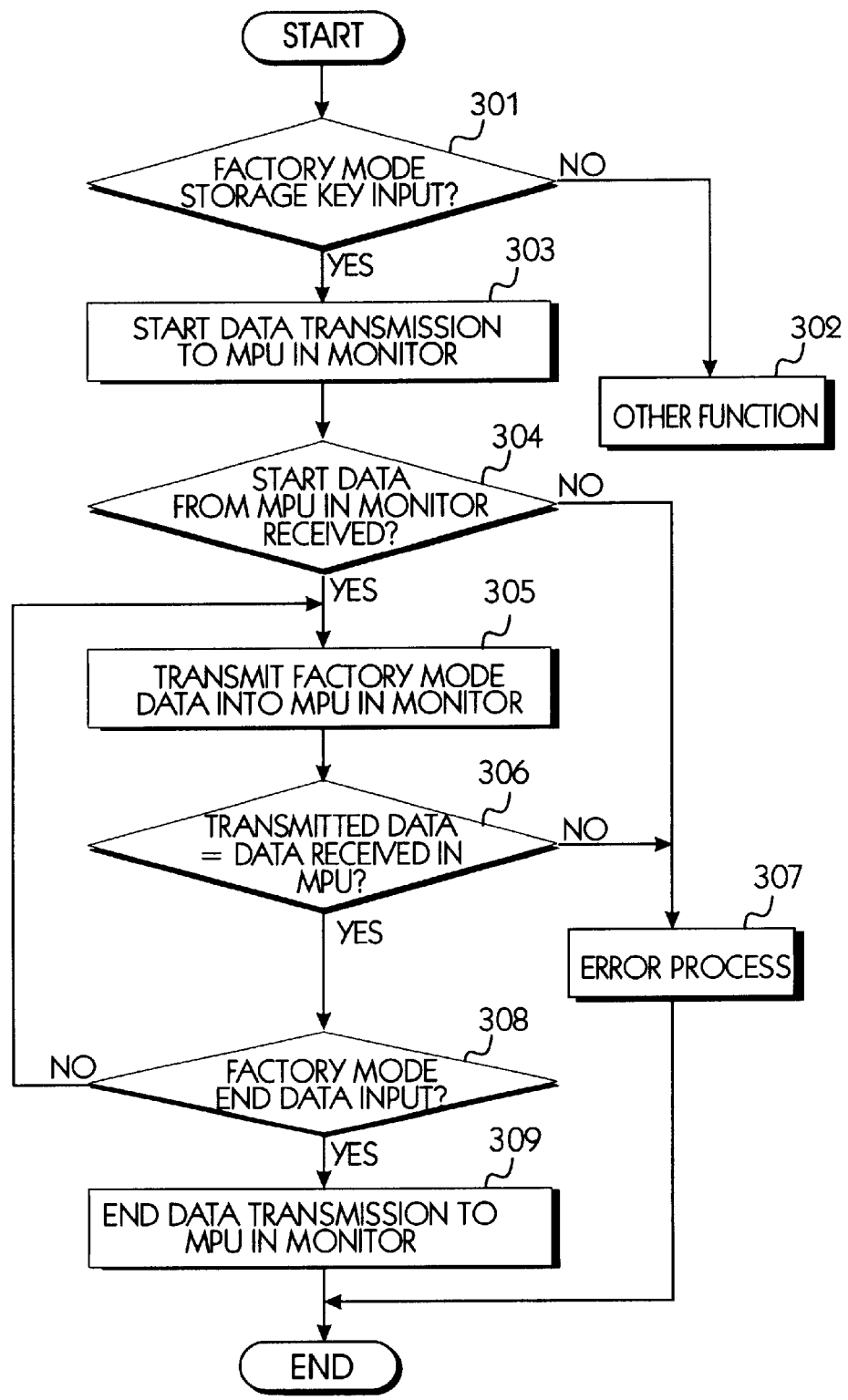
FIG. 4 is a flow chart illustrating a sequence of a process for setting a factory mode operation executed in an external controller in accordance with a preferred embodiment of the present invention incorporating a factory mode setting apparatus.
Figure 5:
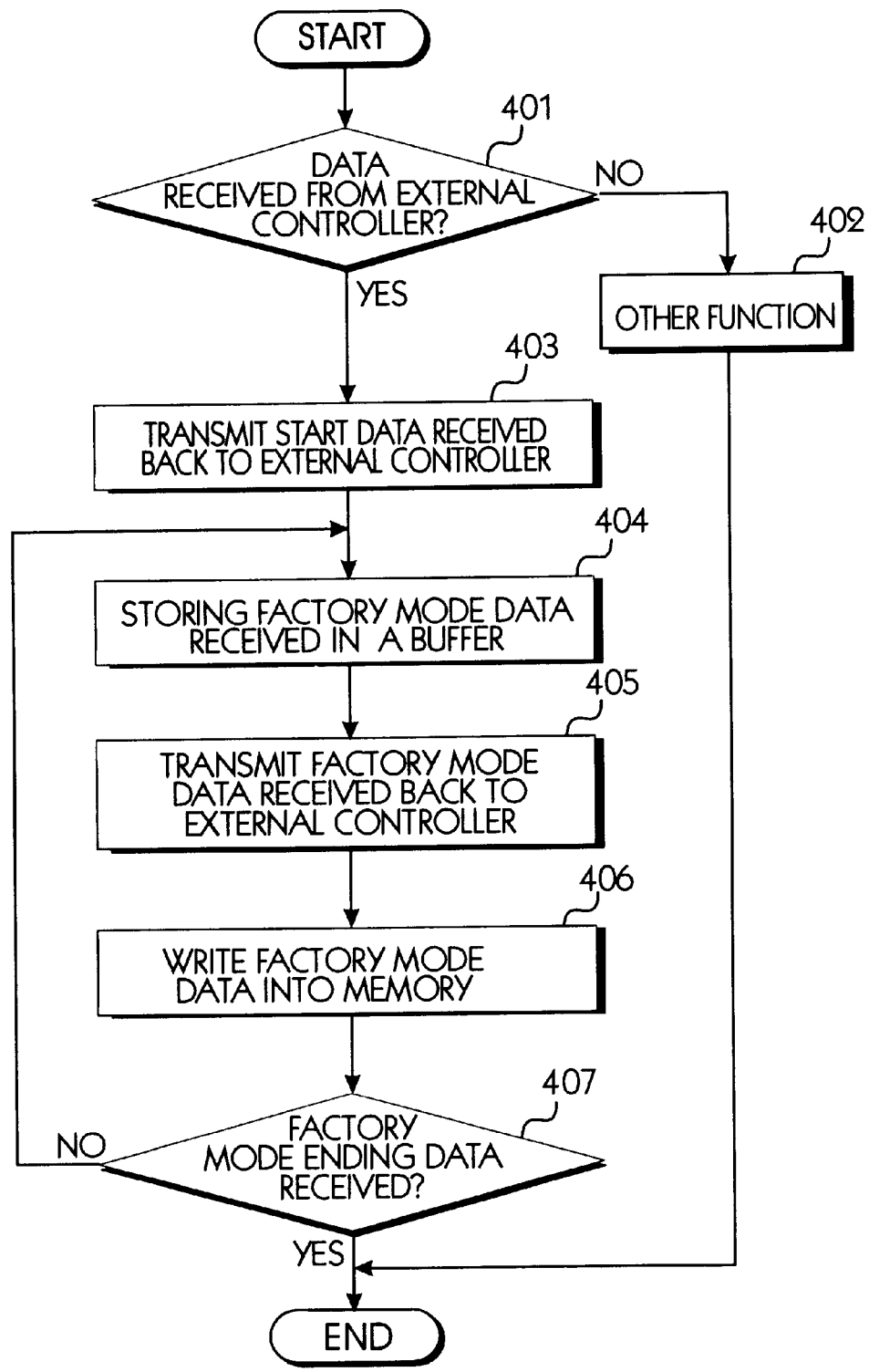
FIG. 5 is a flow chart illustrating the sequence of a process for setting a factory mode of operation executed in a monitor in accordance with a preferred embodiment of the present invention incorporating a factory mode setting apparatus.

FIG. 4 is a flow chart illustrating a sequence of operational process performed in microcomputer 110 in external controller 100, whereas FIG. 5 illustrates that process performed in microcomputer 210 in monitor 200.

A factory mode storage key signal is applied to an input terminal of external microcomputer 110 by a key stroke manipulation of key input device 120 in external controller 100 in step 301. External microcomputer 110 transmits to microcomputer 210 in monitor 200 factory mode start data, for example, a signal indicative of OAAH in hexadecimal code in step 303. Here, external microcomputer 110 may select any one of a pair of ports, SCL and SDA or RXD and TXD, for data transmission. In case of employing Inter-Integrated Circuit Bus I²C communication protocol using a pair of ports SCL and SDA, a serial clock signal is output at one port SCL and also preset factory mode start data is output at another port SDA in synchronized with the clock signal.

Alternatively, in serial data communication using a pair of ports TXD and RXD, the above describe start data is output at data output port TXD.

By way of using Inter-Integrated Circuit Bus I²C protocol for communication purpose exemplar, a process for setting a factory mode of operation is explained hereunder. Microcomputer 210 in monitor 200 receives factory mode start data output from external microcomputer 110 at its port SDA in step 401, and then transmit received data back to the port SDA in step 403. This is to confirm whether the communication channel is in good order. A buffer provided in the path of a communication line connected between both ports SDA in external microcomputer 110 and microcomputer 210 of monitor 200 is that of bidirectional nature.

Here, if a transmission of start data from microcomputer 210 to external microcomputer 110 turns out to be unequal or incorrect, then an error process is performed in step 307. Otherwise, should the above transmission clearly represents the same as the signal generated from external microcomputer 110 in step 304, factory mode data is then subsequently transmitted to microcomputer 210 in monitor 200 in step 305.

The term used as factory mode timing data denotes and includes horizontal position H-POSITION, horizontal width H-WIDTH, vertical position V-POSITION, vertical size V-SIZE, pincushion, barrel, trapezoid, parallel vertical-linearity data, horizontal/vertical synchronizing frequency, polarity of synchronizing signal of a factory mode, resolution data and information data for the monitor.

Consequently, microcomputer 210 in monitor 200 receives factory mode timing data from external microcomputer 110 and stores received data in a temporary buffer 9 in step 404, and then sends stored data again back to external microcomputer 110 in step 405. Thereafter, factory mode timing data already transmitted to microcomputer 210 in external microcomputer 110 in step 306. With the result of comparison that in external microcomputer, the transmitted data to and received data from microcomputer 210 unequals, then subsequent error process procedure is carried out in step 307. Otherwise if the above two data being equal, microcomputer 210 in monitor 200 generates a signal of low logic level at its chip select port CSI so as to select memory 220, and then outputs received factory mode timing data at its data port DO so as to write the output data into factory address provided in memory 300, in step 406.

On the other hand, external microcomputer 110 inputs and determines whether a signal input indicates factory mode ending date transmitted from microcomputer 210 in monitor 200 in step 308, and if negatively determined, then causes the control of routine to go back to repeatedly execute step 308. If this result of the above described determination be positive, then external microcomputer 110 generates factory mode end data for example a signal of OEEH in hexadecimal value and transmits the generated data to microcomputer 210 in monitor 200 in step 309.

A routine of receiving and storing factory mode data which goes back to step 404, is continuously repeated until factory mode ending data applied from external microcomputer 110 is received, and if received, then microcomputer 210 ends factory mode receiving stage in step 407.

During the above process, a display data adjusted by user manipulation after monitor 200 has been powered on is written into use mode address in memory 220. Accordingly, when powered, microcomputer 210 in monitor 200 read data out from memory 220 via its data input port DI so as to output user mode data stored in user mode addresses in memory 220. When monitor 200 is provided with On Screen Display OSD function, microcomputer 210 outputs a signal of low logic level at its chip select port CS2 so as to select On Screen Display Integrated Circuit OSD-IC 230 and then in synchronized with clock signal output at its port SCL, outputs at its port SDA serial data signal responsive to user mode data. On Screen Display Integrated Circuit OSD-IC 230 generates to mixer 940 red R, green G and blue B component signals responsive to user mode data applied from microcomputer 210, and in turn mixes the signals inputted with red R, green G and blue B signals input from video card 300 in a computer system (not shown) so as to generates a mixed signal to preamplifier 250.

Video signal input at an input terminal in preamplifier 250 is amplified therein. Main amplifier 260 connected to preamplifier 250 in cascade inputs pre-amplified video signal, amplifying and then outputting an amplified signal to cathode ray tube 270 such that a user setting mode of operation is able to be visually displayed on a screen of a monitor However, if no data is stored in any of addresses reserved for user mode setting, then microcomputer 210 read out same factory mode data stored in factory mode addresses in memory 220 by transmission for storage from external microcomputer 110 as inherent to a monitor so as to visually display an image on the screen thereof using the factory mode data.

As described herefore, microcomputer 210 outputs factory mode data via a pair of ports SCL and SDA to on Screen Display Integrated Circuit 230, and in turn, by sequential operations of mixer 240, preamplifier 250 and main amplifier, enabling cathode ray tube 270 visually display an image on the screen thereof according to factory setting mode data, Method and apparatus for setting factory mode of operation as contemplated and disclosed or, above explanation modify respective timing data and factory mode date stored in electrically erasable programmable read only memory incorporated in external control, as necessary, establishing the communication channel with a microcomputer housed in a monitor fro transmission of a modified factory mode data by using either serial interface or alternatively Inter-Integrated Circuit Bus $I^2C$ protocol and then writing transmitted data via the microcomputer into factory mode addresses provided in an electrically erasable programmable read only memory, thereby enabling a monitor to meet user requirement without modifying program stored in the microcomputer, at a low cost and lessened time period.

While there have been illustrated and described what are considered to be embodiments of the present invention, it will be understood by those skilled in the art that various changes and modifications may be make, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments failing within the scope of the appended claims.

What is claimed is:

1. A factory mode setting apparatus for setting an adjustable operating mode in a monitor being manufactured in response to a user requirement, said apparatus being characterized in that factory mode timing data stored in a first memory device incorporated in an external controller is written into a factory mode address in a second memory device disposed within said monitor by way of a serial interface data communication path by an operation of a microcomputer associated with said second memory device and disposed in said monitor; said factory mode timing data being first transmitted to said monitor's microcomputer via said serial interface data communication path and then to said second memory device so as to be stored in a reserved area thereof at said factory mode address.

2. An apparatus for setting a factory mode of operation, said apparatus comprising:
   an external controller for transmitting predetermined factory mode timing data stored in a first storage means; and
   a monitor incorporating a second storage means for storing data transmitted from said external controller, and responsive to an instruction thereof;
   said monitor comprising:
      a microcomputer for receiving said factory mode data transmitted from said external controller and for outputting received data at its output terminal;
      said second storage means storing said received data in an address responsive to an instruction signal output from said microcomputer;

an On Screen Display Integrated Circuit for selectively inputting either user mode data or factory mode data, responsive to signal outputs from said microcomputer;

a mixer for mixing outputs supplied from both said On Screen Display Integrated Circuit and a video card in an external computer system;

a preamplifier having its input terminals connected to output terminals of said mixer, for receiving and pre-amplifying a mixed signal input;

a main amplifier connected to said preamplifier in cascade, for amplifying a pre-amplified signal input thereto and for outputting an amplified signal at its output terminal; and a cathode ray tube for receiving said amplified signal at its input port so as to visually display an image on a screen thereof, responsive to said selected user mode or factory mode.

3. The apparatus of claim 2, said external controller comprising an external microcomputer either incorporated internally or alternatively being associated with said first storage means, for writing in and reading out data; and a key input device for inputting a key signal input indicative of said factory mode timing data to said external microcomputer by a key-stroke manipulation.

4. The apparatus of claim 2, said monitor comprising a microcomputer for inputting said factory mode timing data, responsive to said instruction thereof, and for outputting received data at its output terminal; and said second storage means, responsive to a signal output from said microcomputer, storing said data in an address reserved for said factory mode.

5. The apparatus of claim 4, said second storage means comprising both reserved areas of factory mode addresses and user mode addresses.

6. The apparatus of claim 2, said first and second storage means both comprising electrically erasable programmable read only memories.

7. A method for free setting an adjustable factory mode of operation for use with a monitor housing a cathode ray tube therein, said method comprising:

a factory mode data transmission process comprising the steps of:
  transmitting to a microcomputer housed in said monitor a factory mode start data signal when a factory mode storage key signal is input at an input terminal of an external controller;
  repeatedly transmitting factory mode timing data signals to said microcomputer until a factory mode ending key signal is input at said input terminal when factory mode start data transmitted to said microcomputer is determined to be the same as start data input from said microcomputer; and
  then transmitting a factory mode end data signal to said microcomputer when said factory mode ending key signal is input at said input terminal; and a factory mode data receiving process comprising the steps of:
  sending back said factory mode start data signal to said external controller when said signal is received;
  receiving said factory mode timing data at an input terminal of said microcomputer and then storing said received data in a factory mode address in a reserved area of a storage means in said monitor; and
  ending the reception of said factory mode timing data signals where a factory mode end data signal is received.

8. The method of claim 7, in which said factory mode timing data includes horizontal and vertical synchronizing frequency, polarity of synchronizing frequency and resolution parameters.

9. A method comprised of setting an operating mode of a monitor housing a screen presenting variable visual images, and incorporating a microprocessor and an On Screen Display integrated Circuit controlling presentation of said images by said screen, and connected to a computer system via an electrically conductive cable, said method characterized in that when a signal is input from an external controller, indicative of requesting a visual display of On Screen Display characters on a screen of said monitor, the values of horizontal and vertical synchronizing frequency, the polarity thereof and a video signal composed of red, green and blue, that are input from a video card mounted in said computer system are displayed in the form of On Screen Display characters visually perceivable on said screen.

10. An apparatus for setting a factory mode of operation in a monitor in response to a user requirement, said apparatus comprising:

an external controller having a first storage means for transmitting predetermined factory mode timing data stored in said first storage means;

a microcomputer and a second storage means, disposed in the monitor, for storing data transmitted from said external controller;

said data transmitted from said external controller being in response to interactive manipulation of said external controller in conjunction with an on screen display presented by said monitor of the data stored in said second storage means.

11. The apparatus of claim 10, said external controller comprising a key input device for said interactive manipulation of said external controller.

12. The apparatus of claim 10, said microcomputer of said monitor inputting said factory mode timing data, responsive to said instruction thereof, and outputting received data at its output terminal; and said second storage means, responsive to a signal output from said microcomputer, storing said data in an address reserved for said factory mode.

13. The apparatus of claim 10, said first and second storage means both comprising electrically erasable programmable read only memories.

14. The apparatus of claim 10, said second storage means comprising both reserved areas of factory mode addresses and user mode addresses.

15. An apparatus for setting a factory mode of operation, said apparatus comprising:

a microcomputer comprised of an inter-integrated circuit bus communication protocol with a first clock signal port and a first data signal port accommodating bidirectional transmission of timing data signals in a synchronization with clock signals present at said first clock signal port, and a serial data communication protocol with a data reception port and a data transmission port, and respectively accommodating reception and transmission of said timing data signals by said microcomputer independently of said data signal port, a first data input port, and a plurality of chip select ports;

a memory comprised of media storing selected user mode timing data at a user mode address and storing factory mode timing data at a factory mode address, a second clock signal port coupled to said first clock signal port, a data signal port accommodating bidirectional transmission of timing data signals in synchronization with clock signals present at said clock signal port, a second data input port operationally coupled to said first data output port, a second data output port operationally coupled to said first data input port, and a chip select port operationally coupled to a first one of said plurality of chip select port s of said microcomputer;

a screen visually displaying images in response to video signals; and a video stage operationally coupled to said first clock signal port and said first data signal port, and functionally responsive to selection signals applied by said microcomputer via a second one of said plurality of chip select ports of said microcomputer, to drive said screen with video signals corresponding to said selected user mode timing data and, absent said selected user mode data at said user mode address, to drive said screen with video signals corresponding to said factory mode timing data.

16. The apparatus of claim 15, further comprising an external controller transmitting said predetermined factory mode timing data to said microcomputer.

17. The apparatus of claim 15, with said video stage comprising:

an on screen display integrated circuit selectively transmitting color component signals corresponding to either said selected user mode timing data or said factory mode timing data, received from said microcomputer; and a mixer generating said video signals by combining said color component signals received from said on screen display integrated circuit with any color component signals received from an external computer system.

* * * * *